United States Patent [19]
Morgan et al.

[11] Patent Number: 5,441,290
[45] Date of Patent: Aug. 15, 1995

[54] PEDAL ARM, PEDAL ARM ADJUSTER

[76] Inventors: Ronald E. Morgan, Rte. 2 Box 57i;
Daniel M. Morgan, Rt. Box 71, both of Pomeroy, Wash. 99347

[21] Appl. No.: 258,676

[22] Filed: Jun. 13, 1994

[51] Int. Cl.6 .............................................. B62M 1/02
[52] U.S. Cl. .................................... 280/259; 280/287; 280/288.1
[58] Field of Search ................ 280/209, 220, 222, 227, 280/230, 259, 260, 261, 287, 288.1, 225, 242.1, 249, 250, 288.3

[56] References Cited

U.S. PATENT DOCUMENTS

| | | | |
|---|---|---|---|
| 633,534 | 9/1899 | Read | 280/261 |
| 2,602,677 | 7/1952 | Connolly | 280/261 |
| 3,403,927 | 10/1968 | Rettger, Jr. | 280/261 |
| 4,070,032 | 1/1978 | Cunningham | 280/231 |
| 4,502,702 | 3/1985 | Weaver | 280/231 |
| 4,559,892 | 12/1985 | Cascallana | 280/261 X |
| 4,618,160 | 10/1986 | McElfresh | 280/288.1 |
| 5,072,961 | 12/1991 | Huppe | 280/278 |
| 5,082,302 | 1/1992 | Nacar | 280/250 X |
| 5,242,181 | 9/1993 | Fales et al. | 280/231 |

FOREIGN PATENT DOCUMENTS

| | | | |
|---|---|---|---|
| 3837018 | 5/1990 | Germany | 280/288.1 |
| 4206683 | 9/1993 | Germany | 280/287 |
| 1382733 | 3/1988 | U.S.S.R. | 280/287 |
| 1406024 | 6/1988 | U.S.S.R. | 280/287 |

Primary Examiner—Brian L. Johnson
Assistant Examiner—Victor E. Johnson
Attorney, Agent, or Firm—Wells, St. John, Roberts, Gregory & Matkin

[57] ABSTRACT

An adjustable pedal arm is mounted on an occupant powered vehicle. The pedal arm is elongated and tubular, extending from one end, mounting pedals and cranks, to a remaining end that is pivotably mounted to the vehicle frame for adjustable pivotal movement about an axis. An internal drive assembly is provided within the pedal arm, extending from the crank arms to the remaining end of the pedal arm. An external drive assembly connects the internal drive assembly to at least one of the vehicle wheels. An adjuster is mounted between the pedal arm and vehicle frame to permit selective adjustment of the pedal position relative to the occupant seat. The pedal arm with the use of a pedal arm adjuster, pivots about a jack shaft located on the vehicle frame to meet the occupant's preferred pedal position.

4 Claims, 4 Drawing Sheets

PEDAL ARM, PEDAL ARM ADJUSTER

FIELD OF INVENTION

This invention is related to human powered vehicles, more specifically to a pedal powered single or multi-occupant vehicle with an adjustably positionable pedal arm.

BACKGROUND OF THE INVENTION

The present invention is exemplified in this disclosure on a 4-wheel pedal powered vehicle to evidence its improvement as a means of transferring energy in a single or multi-occupant configuration. Occupant powered vehicles have been a commonly recognized item in the art, in side-by-side seating and pedaling relationships or in unitary single rider frames.

This invention allows for improved single or tandem operation with one or more easily adjustable forward pedal arms for simplified physiological power transfer. Traditionally, adjustments in pedal to seat distance are made by moving the seat position or by complex disassembly or assembly of the seat, pedals and pedal axle, or frame itself.

With the present invention, the adjustment to persons with varying leg lengths is accomplished by mounting the pedals, pedal axle, pedal axle bearings and sprocket or pulley at the end of at least one pedal arm with the opposite end of the pedal arm rotating about an axle that is parallel to the plane of rotation for the pedal axle. This axle is a single jack shaft affixed to the frame in such a manner as to allow for the free rotation of the axle relative to both the pedal arm and the base frame. A drive assembly connects the pedal axle with the jack shaft so that power applied to the pedal axle via the pedals will be transmitted to the jack shaft. The jack shaft in turn transmits the power to a driver member.

Adjustment of the pedal arm is achieved by turning a threaded pedal arm adjuster. This threaded pedal arm adjuster is attached to the pedal arm, and pulls up or lowers the pedal arm to the desired height. A threaded pedal arm adjuster is provided for each pedal arm on the vehicle.

It is an object of this invention to provide a mechanism by which a rider may pedal at the optimum distance for the rider's legs, thus enabling persons of substantially unequal leg length to sit on the same plane and still pedal comfortably. Because the drive systems are independent in tandem embodiments, it is not necessary for two persons to be pedaling at the same time to propel the vehicle.

DESCRIPTION OF THE PREFERRED EMBODIMENT

The pedal arm 1, is comprised but not limited to a tubular member, not limited in shape (rectangle, round etc.).

Figure 3:
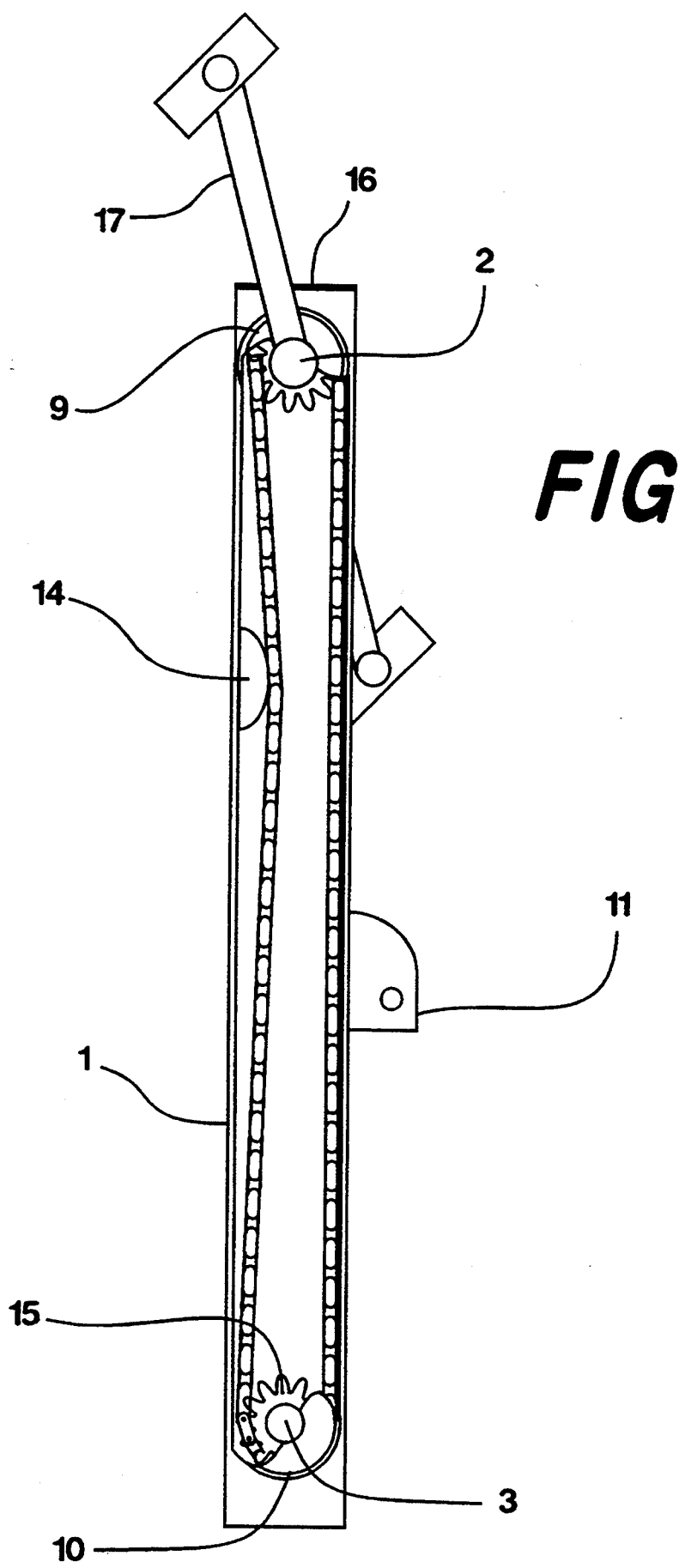
FIG. 3 is an enlarged detail side elevation view of components within the pedal arm.

Because of the tubular design of the pedal arm 1, full protection of the enclosed internal drive assembly, whether a chain, belt or other preferred transfer device is fully protected. Full servicing of the internal drive assembly as shown in FIG. 3 is allowed through the removal of either the pedal arm endcap 16. The pedal arm 1 as shown in FIG. 3 may also be disengaged from the jack shaft 3 at the jack shah bearing 8.

The pedals are connected to the pedal arm using traditional means in the art, that being pedal cranks 17 connected to a pedal axle 2 and its associated bearings 9.

The pedal axle 2 transfers energy to the internal drive assembly as shown in FIG. 3 through a sprocket or pulley or any preferred linking device. The inventors currently prefer an endless roller chain driven by sprockets due to ease of maintenance and practicality. The chain or belt drive in this application is kept taut by using a spring-loaded adjustable plastic block 14 tensioning the drive assembly link (endless chain or cable).

The pedal arm 1 is connected to the jack shaft 3 using bearings 10 which allow the pedal arm 1 to rotate freely about the jack shaft 3, while not prohibiting free movement of the jack shaft 3. The collars 8 on the bearings located at the jack shaft 3 and at the end 10 of the pedal arm 1 combine to prevent sideways movement of the pedal arm 1.

The internal drive assembly as shown in FIG. 3 is connected to the jack shaft 3 by an internal jack shaft sprocket 15. The jack shaft 3 receives energy via the drive assembly (FIG. 3) and rotates accordingly.

An external drive assembly is connected to the internal drive assembly within the pedal arm through a unidirectional freewheel type sprocket or gear cluster 5 is attached to the jack shaft 3 using a keyway or other attachment. Should a geared chain be used for driving the wheel, a standard gear cluster and derailleur commonly used in the art will be placed at the current location of the freewheel sprocket or gear cluster 5.

An endless drive chain or belt is then connected to the rear wheel through a wheel sprocket 18 (FIG. 4) mounted directly to the wheel to transfer energy to the driven wheel and to thereby propel the vehicle forward.

This transfer of human power through the pedal arm to the wheel can be accomplished through any existing pedal arm 1 as described in this embodiment. Because any one of the pedal arms 1 are connected to independent jack shafts, the subsequent power transfer is independent. In a two occupant situation, one occupant is able to stop the pedaling, while the other occupant continues. The external freewheel sprocket or gear cluster 5 permits forward motion of the jack shaft 3 even if pedaling is halted. This is similar in concept to the previously developed side by side relationship, but offers an adjustable forward placed pedal which is easily adjusted, thus being mechanically as physiologically advantageous (as when used in a semirecumbent orientation).

Figure 4:
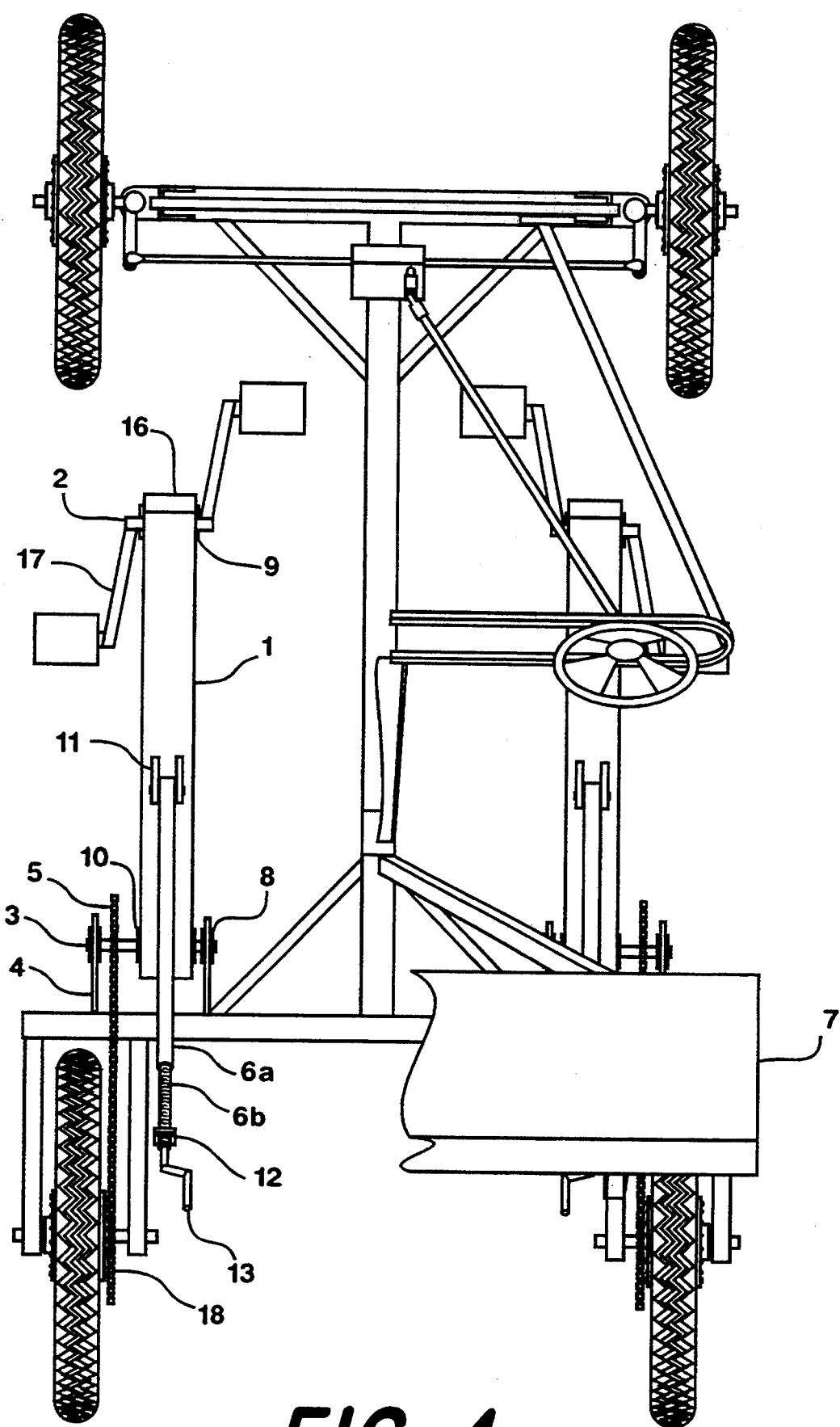
FIG. 4 is a top view of the frame construction showing frame structure and complete drive assemblies, with portions broken away for clarity.

As described in this preferred embodiment and depicted in FIG. 4, the unit has two pedal arms, of which each has a pedal arm adjuster 6. Pedal arms in excess of two may be added by modifications to the mounting and possible sharing of common jack-shafts. The pedal arm assembly would remain intact, with the possible exception of a rear unidirectional or freewheel sprocket used in the drive assembly as shown in FIG. 3.

The frame may also incorporate a change in seat position. In such a case, the jack shaft and pedal arm would simply be moved forward or backward, and the length of the pedal arm would be changed to accommodate its new location.

The pedal arm adjuster 6 is a two piece interconnected assembly is preferably a lead screw type. The lower portion 6a is preferably tubular and the upper portion is preferably a crankable threaded insert 6b. The lower portion 6a is attached to the pedal arm 1 at the pedal adjuster mount 11 using a simple bolt, connecting pin or other preferred device. The crankable threaded insert 6b is threaded into the lower portion 6a.

Adjustment of the pedal arm 1 is accomplished by turning the threaded crankable threaded insert 6b with a crank 13 which may be permanently attached to this crankable threaded insert 6b.

Depending on the direction of rotation the crankable threaded insert 6b will push or pull the pedal arm 1, toward or away from the seat 7. The pedal arm adjuster 6 is held to the frame by a self aligning anchor block 12.

The inventors prefer the application of lead screw type pedal arm adjuster 6, as it improves upon the traditional manufactured stationary pedal positions. Alternate pedal arm adjuster configurations may be used such as a cable, ratcheted bar, rack and pinion etc. (not shown).

Figure 1:
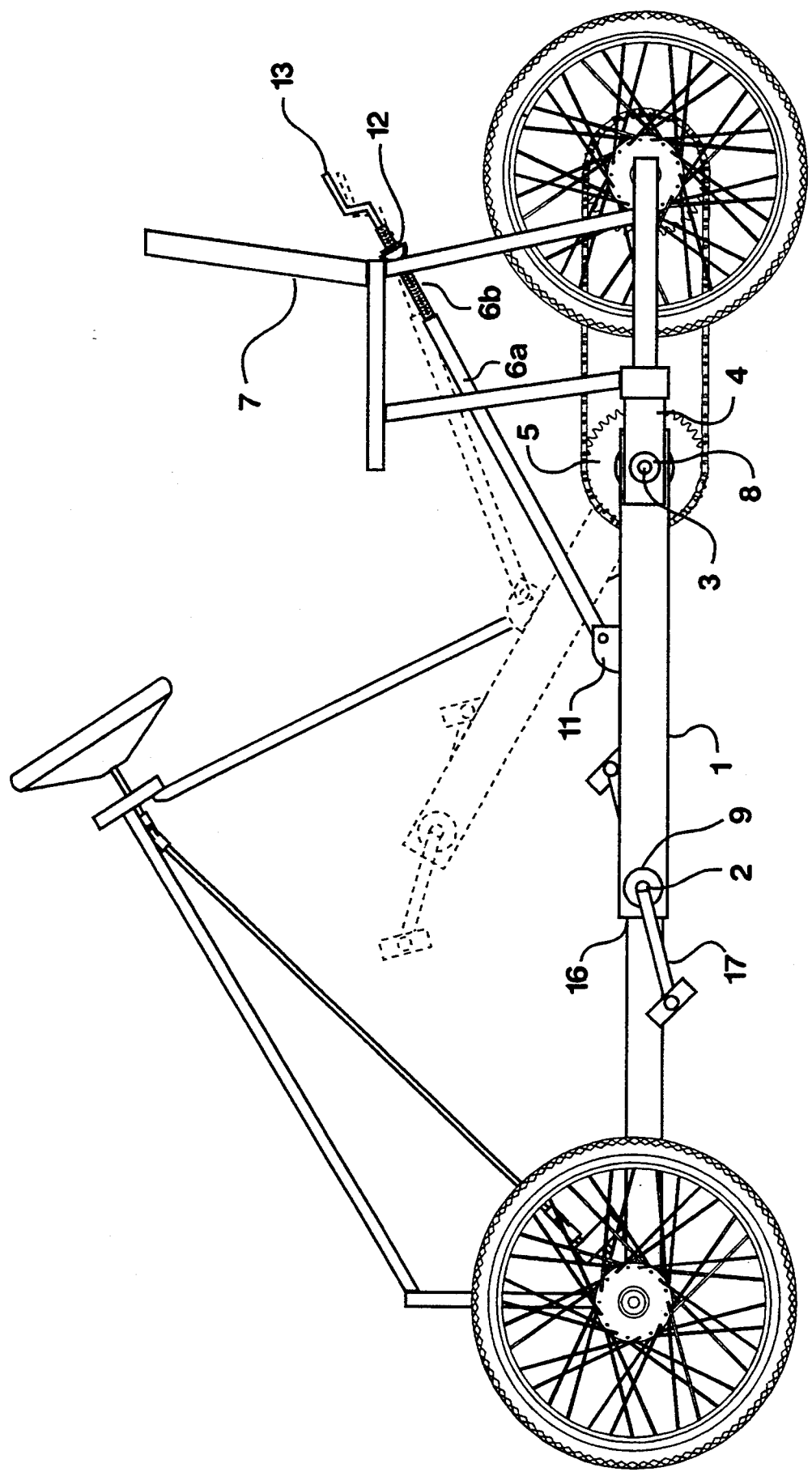
FIG. 1 is a side elevation view of the semirecumbent pedal drive system and seat.
Figure 2:
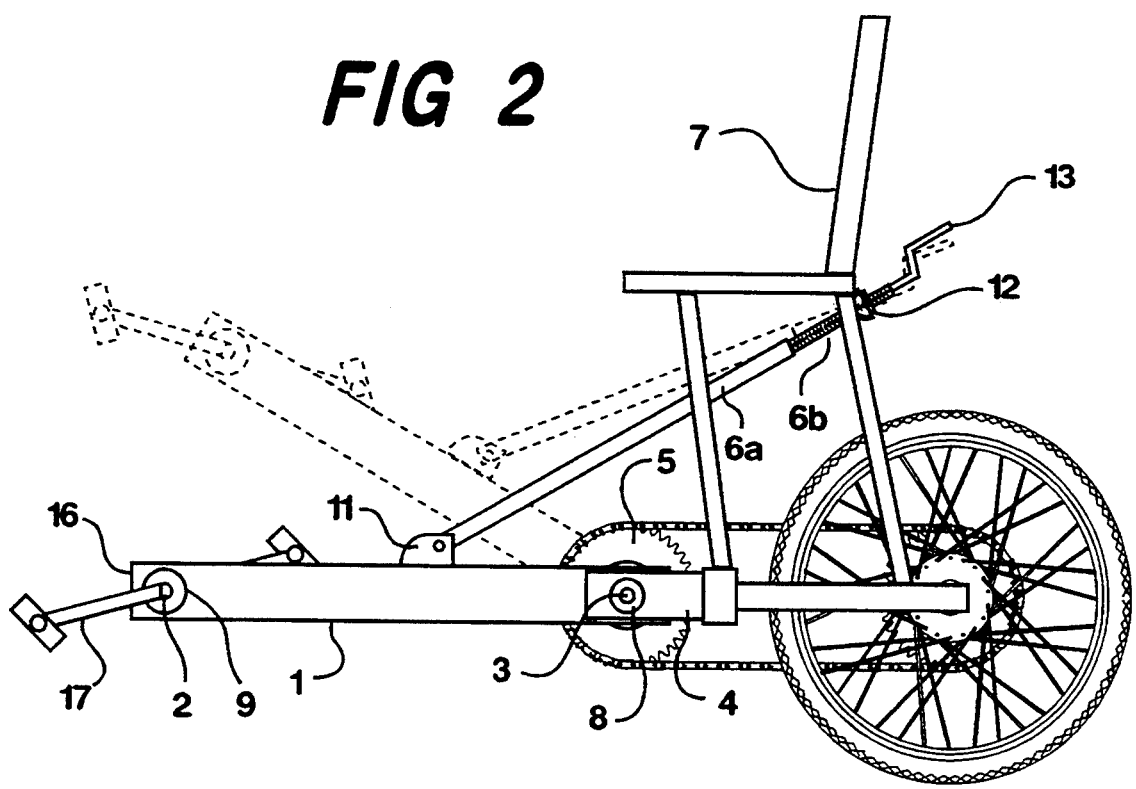
FIG. 2 is a fragmented side elevation view of the semirecumbent pedal drive system, seat and pedal arm adjuster, and the adjustable capability of the pedal arm.

The scope of the pedal arm's rotation can be restricted by the length of threaded area on the adjuster 6. An increase in the distance between terminal points of the crankable threaded insert 6b, results in an increased rotation range (as seen in FIG. 2) of the associated pedal arm 1.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed:

1. An adjustable pedal assembly for an occupant powered vehicle frame comprising:
   an elongated pedal arm having one end and a remaining end;
   bearings for mounting the one pedal arm end to the vehicle frame substantially free rotation about an axis;
   external pedals and pedal cranks mounted to the pedal arm at said remaining end;
   a pedal arm adjuster for adjustably connecting the pedal arm and vehicle frame and for operation to selectively pivot the pedal arm and pedals mounted thereto about the axis; and wherein
   said pedal arm adjuster includes a lower portion connected to the pedal arm intermediate said one end and said remaining end and having an upper portion adjustably mounted to said lower portion and connected to the vehicle frame such that by adjusting said lower and upper portions, said pedal arm adjuster pivots the pedal arm about said axis with respect to said frame.

2. An adjustable pedal assembly for an occupant powered vehicle having a vehicle frame, as claimed by claim 1, wherein the pedal arm adjuster is comprised of:
   a two piece lead screw assembly including a lower portion connected to the pedal arm outward of said axis, and an upper crankable threaded insert threadably mounted to the lower portion and mountable to the vehicle frame such that rotation of the threaded insert adjustably pivots the pedal arm about said axis.

3. An occupant powered vehicle, comprising:
   a frame;
   ground engaging wheels rotatably mounted to the frame;
   an occupant seat on the frame;
   an external drive assembly connected to at least one of the wheels;
   an elongated pedal arm having one end and a remaining end;
   bearings mounting the one pedal arm end to the frame for substantially free rotation about an axis;
   external pedals and pedal cranks mounted to the pedal arm at said remaining end operably connected to the drive assembly; and
   a pedal arm adjuster adjustably connecting the pedal arm and the frame for adjustably pivoting the pedal arm and pedals mounted thereto about the axis relative to the occupant seat; and wherein
   said pedal arm adjuster includes a lower portion connected to the pedal arm intermediate said one end and said remaining end and an upper portion adjustably mounted to said lower portion and connected to the frame such that by adjusting said lower and upper portions, said pedal arm adjuster pivots the pedal arm about said axis with respect to said frame.

4. An occupant powered vehicle, comprising:
   a frame;
   ground supporting wheels on the frame;
   an occupant seat on the frame;
   a tubular elongated pedal arm having one end and a remaining end;
   bearings for mounting the one pedal arm end to the frame substantially free rotation about an axis;
   external pedals and pedal cranks mounted to the tubular elongated pedal arm at said remaining end;
   an internal drive assembly connected to the external pedals and extending within the tubular elongated pedal arm from the pedal cranks to the remaining end;
   an external drive assembly on the frame, connecting at least one of the ground supporting wheels and the internal drive assembly at the remaining end of the pedal arm;
   a pedal arm adjuster adjustably connected between the elongated tubular pedal arm and frame for selectively pivoting the elongated tubular pedal arm and pedals mounted thereto about the axis to selectively position the pedals and pedal cranks about the axis relative to the occupant seat; and wherein
   said pedal arm adjuster includes a lower portion connected to the pedal arm intermediate said one end and said remaining end and an upper portion adjustably mounted to said lower portion and connected to the frame such that by adjusting said lower and upper portions, said pedal arm adjuster pivots the pedal arm about said axis with respect to said

* * * * *